United States Patent Office 2,968,541
Patented Jan. 17, 1961

2,968,541

NITROSTARCH COMPOSITION AND METHOD OF MAKING THE SAME

Paul E. Wilt III and Richard G. Nelson, Tamaqua, Pa., assignors to Atlas Powder Company, Wilmington, Del., a corporation of Delaware No Drawing. Filed May 7, 1957, Ser. No. 657,499

9 Claims. (Cl. 52—5)

This invention relates to free flowing, granular, non-dusting solid nitrostarch compositions and methods of preparing them.

More specifically this invention relates to a non-dusty nitrostarch product which may be prepared by treating a normally fine powder or dust consisting essentially of nitrostarch with a liquid or solid polybutene possessing relatively high viscosity and characterized by a great degree of tackiness. A liquid polybutene possessing the required viscosity and tackiness has been found particularly advantageous in rendering nitrostarch essentially non-dusting.

In the preparation of dynamites, ingredients such as wood pulp, ammonium nitrate, chalk, nitrostarch and others are included in the final mixture. Nitrostarch as customarily used in the production of dynamites has often been in the form of a fine dust or powder and the handling and use of such a product in dynamite manufacture is a hazard from an explosion standpoint. It is therefore an object of the present invention to improve the physical characteristics of nitrostarch, making it safer to handle and giving it a form which is desirable in dynamite manufacture.

The normally dusty nature of nitrostarch can be largely eliminated using water to allay the dust. However, the addition of sufficient water to allay the dust, seriously affects the explosive nature of the nitrostarch. Likewise, other agents when incorporated in an amount sufficient to render the nitrostarch non-dusting have been found to be objectionable when included in the final dynamite mixture.

It has now been found that a viscous polybutene can be dispersed through a quantity of nitrostarch, which is normally a fine powder to cause the powder to coagulate into clusters which are of such size and nature that subsequent handling and processing of the nitrostarch is achieved without the formation of fine nitrostarch dust which usually accompanies this operation. A preferred concentration of the polybutene useful in the practice of the present invention is from about 0.5 to about 5.0% based on the dry weight of the nitrostarch. A particularly preferred range of polybutene concentration useful in the practice of the present invention is from about 0.75% to about 1.25% based on the dry weight of the nitrostarch.

According to the present invention a viscous liquid polybutene product is selected from the group consisting of a viscous liquid polybutene, preferably a liquid polybutene possessing tackiness, and a tacky solution of a solid rubbery polymer in a liquid polybutene. The polybutene useful in the practice of the present invention is also known as polymerized butene, polymerized isobutylene, polyisobutylene, and one brand is sold in commerce by Esso Standard Oil Company under the trademark "Paratac." The solid rubbery polymer dissolved in the liquid polybutene hereinabove disclosed may be any of a variety of solid, plastic or rubber-like materials, and includes rubbery polybutene, natural rubber or synthetic rubber, and the like, which solids are soluble in liquid polybutene.

The viscous liquid products hereinabove disclosed although present in relatively small amounts are effective in converting the normally dusty nitrostarch into relatively dust free granules coagulated into clusters which when present in an explosive composition do not deleteriously affect the explosive properties of the final composition containing it. Thus, the sensitiveness and velocity of the dynamite mixture is not appreciably affected by the addition of the polybutene to the nitrostarch prior to its incorporation in the final dynamite composition.

It is well known that the viscosity, stickiness or tackiness of polybutene depends on the degree of polymerization thereof as indicated by the molecular weight of the product, and polybutene, as do most polymeric materials, progresses from a liquid of relatively low viscosity and tackiness through a liquid product of relatively high viscosity and characterized by a great degree of tackiness, to a plastic or rubber-like solid as the degree of polymerization of the product increases. It is understood that the term molecular weight as used above means the average molecular weight of the product since a polymerized product usually contains polymers of both higher and lower molecular weights than the average molecular weight. The molecular weights of the solid rubbery polybutene materials used as hereinafter described are determined by the Staudinger Method using the relation:

$$\text{Molecular weight} = \frac{\text{intrinsic viscosity}}{0.0000318}$$

The liquid polybutenes are identified according to their viscosities determined with the Saybolt Universal viscosimeter and the viscosities hereinafter set forth are expressed as SSU (seconds Saybolt Universal), the temperature of the liquid used in the determination of viscosity being 210° F. for the more viscous liquids and 100° F. for the less viscous liquids. Liquids whose viscosity at 210° F. is below 50 SSU are measured at 100° F. and in the case of the liquid polybutenes, a viscosity of 50 SSU (210° F.) corresponds to approximately 350 SSU (100° F.).

When the liquid product employed in the nitrostarch as hereinafter disclosed is a polybutene, per se, the viscosity thereof may vary over a wide range but advantageously it will have a viscosity of at least approximately 180 SSU (100° F.) and preferably the polybutene will have been polymerized to the stage where the product itself is liquid of relatively high viscosity and possessing tackiness. It has been found that a polybutene having a viscosity of from about 180 SSU (100° F.) to about 2700 SSU (210° F.), and preferably from about 135 SSU (210° F.) to about 620 SSU (210° F.), will impart especially desirable properties to the nitrostarch and render said nitrostarch relatively nondusting. In an embodiment of the invention when the tacky liquid product comprises a solution of a solid, rubbery polymer in a liquid polybutene, the liquid polybutene employed will have been polymerized only to a relatively low degree when it will be a liquid of relatively low viscosity, for example, the polybutene will advantageously have a viscosity between about 50 SSU (100° F.) and about 620 SSU (210° F.), preferably between about 100 SSU (100° F.) and about 300 SSU (210° F.). As indicated above, the desired tackiness and viscosity is imparted to a liquid polybutene of relatively low molecular weight by dissolving therein a solid, rubber-like polymer, that is a high molecular-weight polymer which is soluble in the liquid polybutene. While, as stated, the solid rubbery polymer may be a variety of polymeric materials, advantageously the solid rubber-like polymer is a polybutene or natural rubber. When the solid rubber-like polymer is polybutene it may be any polybutene product having such properties, and generally the molecular weight of the polybutene rubber is from about 40,000 to about 120,000, although solid polymers of lower or higher molecular weight may be used as desired. Particularly satisfactory results are obtained when a polybutene having a molecular weight in the neighborhood of 80,000 is used.

The type of compounds which may be incorporated in the nitrostarch in the practice of the present invention are tacky or sticky substances as above disclosed and consequently they are difficult to disperse throughout a quantity of nitrostarch. In order therefore to secure maximum effectiveness, the polybutene may be added to the nitrostarch in the form of an emulsion in water. The emulsion may be dispersed throughout the nitrostarch and the nitrostarch then dried. The polybutene in an emulsion is in finely divided form and as such it is dispersed throughout the nitrostarch so that the nitrostarch is agglomerated into particles of such size that uniform dispersion of the nitrostarch throughout an ultimate dynamite composition may be accomplished. At the same time, the nitrostarch when dried is rendered free flowing and essentially non-dusting.

As hereinabove mentioned emulsions of polybutene in water are not readily formed and because of the sticky and tacky nature of the polybutene it has been found desirable to employ a solvent diluent for the polybutene. Suitable solvents for the polybutenes useful in the practice of the present invention include hydrocarbons, chlorinated hydrocarbons and cyclic or straight chain hydrocarbon petroleum ethers of up to 9 carbon atoms having a viscosity of from about 2.5 SSU (100° F.) to about 85 SSU (210° F.) which solvents will not dissolve the nitrostarch and are of low viscosity. Suitable solvents and solvent mixtures include for example, benzene, xylene, toluene, kerosene, solvent napthas, ligroin, cyclohexane, fuel oil such as No. 10 motor oil and the like. Except to the extent that it may be desired to leave such solvent materials in the nitrostarch it is preferred to use volatile materials which may be removed by drying.

The solution of polybutene may be applied to the nitrostarch by homogenizing it with an aqueous nitrostarch slurry and removing water and volatile materials from the slurry by drying.

It is usually easier to obtain a more effective distribution of the polybutene through the nitrostarch if the polybutene solution is emulsified with water before being added to the nitrostarch and this procedure is usually preferred.

It is desirable to employ an emulsifier to aid in maintaining the stability of such emulsions. Emulsifiers useful in preparing the emulsions of polybutene include for example, polyoxyethylene ethers of higher fatty amines, as for example, 20 polyoxyethylene tallow amine, wherein 20 indicates the number of oxyethylene groups per mol of amine and wherein by tallow amine is meant the amine derivative which results in the replacement of —COOH by —CH$_2$NH$_2$ in the natural mixture of acids obtained from tallow oil, polyoxyethylene ethers of higher fatty alcohols, as for example, 2 polyoxyethylene tridecyl alcohol, wherein 2 indicates the number of oxyethylene groups per mol of tridecyl alcohol, salts of alkyl aryl sulfonic acids, as for example, isopropylamine dodecyl benzene sulfonate.

The hereinabove disclosed emulsions may be added to wet nitrostarch or, preferably, to aqueous slurries of nitrostarch containing up to about 50% by weight of nitrostarch.

It has also been found desirable to stablize the nitrostarch of the present invention by adding a stablizer to the nitrostarch. A desirable amount of stabilizer which may be added to the nitrostarch is from about 0.50% to about 1.0% based on the dry weight of the nitrostarch. Suitable stabilizers include for example, urea, diphenyl amine, ammonium oxalate, ammonium phosphate and the like.

Mineral oil or other suitable hydrocarbon fractions may also be added to nitrostarch compositions to decrease the sensitivity of the nitrostarch to initiation by electrostatic discharge and to increase the water resistance of the nitrostarch powder. The amount of mineral oil which may be added to the nitrostarch is from about .25% to about 1.0% based on the dry weight of the nitrostarch. Suitable hydrocarbon fractions include the relatively non-volatile petroleum fractions up to about No. 10 motor oil. The hereinabove additives may be added to the nitrostarch in the form of an emulsion with the polybutene and the total quantity of the additives should be such that the nitrostarch does not lose its character as a nitrostarch product useful in the preparation of explosive compositions. It is therefore preferred that the non-dusting free flowing composition of the present invention contain at least 90% nitrostarch by weight.

The non-dusty, free flowing granular nitrostarch products of the present invention usually show an additional outstanding advantage over untreated nitrostarch as being much less sensitive to electrostatic discharges. This property is highly advantageous from a safety standpoint.

EXAMPLE I

An emulsion was prepared of the following ingredients:
1.4 g. of urea
0.2 g. of 20 polyoxyethylene tallow amine
5 cc. of H$_2$O
0.8 g. of kerosene
1.65 g. of polybutene 400 SSU (210° F.)

The emulsion was applied by means of an eye dropper to 165 g. of wet nitrostarch spinning on a 5″ laboratory centrifical filter at about 2800 r.p.m. The nitrostarch was dried over night in the open air after which it contained about 1% water. The nitrostarch treated as hereinabove described possesses desirable non-dusting properties as compared to a nitrostarch sample not so treated when dried to about 1% water.

The static build-up of nitrostarch treated in accordance with this invention was determined at relative humidity of 35% to 40% by sliding 10 grams of dry nitrostarch over 24″ of dynamite shell paper onto a sheet of 24 gauge aluminum having dimensions of 10″ x 14″ which was insulated from ground and attached to a static voltmeter. No measurable static build-up was observed. When an untreated nitrostarch was similarly tested, a static build-up of 360 volts was observed.

Additional examples were performed by adding each of the emulsions of the composition set forth in Table I below to 150 grams of wet nitrostarch in a manner similar to that described in Example I.

Table I

| | Example 2 | Example 3 | Example 4 | Example 5 |
|---|---|---|---|---|
| Urea | .75 | .75 | .75 | .75 |
| Polybutene, 400 SSU (210° F.) | 0.8 | 1.25 | 1.0 | 1.0 |
| Mineral Oil, 40 SSU (210° F.) | 0.5 | 0.25 | 0.5 | 0.4 |
| Benzene | 1.0 | 2.0 | 1.0 | 1.0 |
| 20 Polyoxyethylene ether of tallow amine | 0.25 | 0.25 | 0.25 | 0.25 |
| H$_2$O | 2.0 | 2.0 | 2.0 | 2.0 |

In Table I the amounts of ingredients are given as percent based on the dry weight of the nitrostarch. The nitrostarch treated with the emulsions of the above examples possessed excellent non-dusting qualities as compared to nitrostarch not treated with the polybutene emulsions.

EXAMPLE 6

500 grams of nitrostarch are added to 1000 grams of water to form an aqueous slurry of nitrostarch. A kerosene solution of polybutene is prepared by dissolving 5 grams of polybutene 400 SSU (210° F.) in 100 grams of kerosene. The aqueous nitrostarch slurry is fed into a homogenizer along with the polybutene solution after which the nitrostarch is filtered and air dried. The nitrostarch treated as hereinabove described possesses desirable non-dusting properties as compared to a nitrostarch sample not so treated.

EXAMPLE 7

500 grams of nitrostarch are added to 1500 grams of water in a 3 liter beaker and agitated for two minutes with a 2" blade on a Lightning Mixer at 1200 r.p.m. To the above slurry is added an emulsion of 5 g. polybutene 400 SSU (210° F.), 10 g. of benzene and 0.5 g. of 20 polyoxyethylene ether of tallow amine in 100 ml. of water. The slurry and emulsifier are agitated for an additional 5 minutes to disperse the emulsion throughout the nitrostarch slurry after which it is filtered and air dried. The nitrostarch prepared as hereinabove described possesses excellent non-dusting qualities as compared to nitrostarch not treated with the polybutene emulsion.

EXAMPLE 8

The polybutene treated nitrostarch of Example 1 was made up by conventional dynamite mixing techniques into a dynamite having the following formula:

| | Weight percent |
|---|---|
| Nitrostarch of Example 1 | 20.0 |
| Fine coated ammonium nitrate | 60.0 |
| 14 mesh sodium nitrate | 15.1 |
| Coarse apricot pit pulp | 1.5 |
| Guar flour | 1.0 |
| Calcium stearate | 0.2 |
| Atomized aluminum dust | 2.0 |

This dynamite was packed into 1⅛" x 8" cartridges and had a density such that 143.7 of these cartridges made up 50 pounds. In a gap sensitivity test, this dynamite was found to have a sensitivity of ½ inch and its detonation velocity was determined to be 11,456 feet per second.

By the term "consisting essentially of" as used in the claims, we mean to include compositions containing the named ingredients in the proportions stated and any other ingredients which do not deleteriously affect the compositions for the purposes stated in the specification.

What we claim and desire to protect by Letters Patent is:

1. A method of inhibiting dusting of nitrostarch which comprises dispersing polybutene through said nitrostarch.

2. A method of inhibiting dusting of nitrostarch which comprises dispersing throughout said nitrostarch from about 0.5% to about 5.0% based on the dry weight of the nitrostarch of polybutene having a viscosity of from about 180 SSU (100° F.) to about 2700 SSU (210° F.).

3. A method of inhibiting dusting of nitrostarch which comprising dispersing throughout said nitrostarch from about .75% to about 1.25% based on the dry weight of the nitrostarch of polybutene having a viscosity of from about 135 SSU (210° F.) to about 620 SSU (210° F.).

4. A method of inhibiting dusting of nitrostarch which comprises treating an aqueous slurry of nitrostarch with an emulsion comprising from about .75% to about 1.25% based on the dry weight of the nitrostarch of polybutene having a viscosity of about 135 SSU (210° F.) to about 620 SSU (210° F.), a hydrocarbon having a viscosity of about 2.5 SSU (100° F.) to about 85 SSU (210° F.) and an emulsifier selected from the group consisting of polyoxyethylene ethers of higher fatty amines and thereafter drying said treated nitrostarch which composition is essentially non-dusting and free flowing.

5. A free flowing, granular, non-dusting composition of matter consisting essentially of at least 90% by weight of nitrostarch and polybutene.

6. A free flowing, granular, non-dusting composition of matter consisting essentially of at least 90% by weight of nitrostarch and from about .50% to about 5.0% based on the dry weight of the nitrostarch of polybutene having a viscosity of from about 180 SSU (100° F.) to about 2700 SSU (210° F.), mineral oil, and an emulsifier selected from the group consisting of polyoxyethylene ethers of higher fatty amines.

7. A free flowing, granular, non-dusting composition of matter consisting essentially of at least 90% by weight of nitrostarch and from about 0.5% to about 1.25% based on the dry weight of the nitrostarch of polybutene having a viscosity of about 400 SSU (210° F.), a mineral oil having a viscosity of about 40 SSU (210° F.) and 20 polyoxyethylene ether of tallow amine.

8. A method of preparing a free-flowing nitrostarch composition which comprises dispersing throughout said nitrostarch an aqueous emulsion of a solution of polybutene in a low viscosity hydrocarbon solvent in which nitrostarch is not soluble, and an emulsifier which emulsifies said solution with water and thereafter drying said treated nitrostarch.

9. A free-flowing, granular, non-dusting composition of matter consisting essentially of at least 90% by weight of nitrostarch, a solution of polybutene in a low viscosity hydrocarbon solvent in which nitrostarch is not soluble and an emulsifier which will emulsify said solution in water.

References Cited in the file of this patent

UNITED STATES PATENTS

| | | |
|---|---|---|
| 1,728,307 | Rupp | Sept. 17, 1929 |
| 1,970,578 | Schoeller et al. | Aug. 21, 1934 |
| 2,147,698 | Goodyear | Feb. 21, 1939 |
| 2,541,389 | Taylor | Feb. 13, 1951 |